I. SMEDBERG.
INSECT TRAP.
APPLICATION FILED APR. 12, 1919.
1,368,767.
Patented Feb. 15, 1921.
2 SHEETS—SHEET 2.
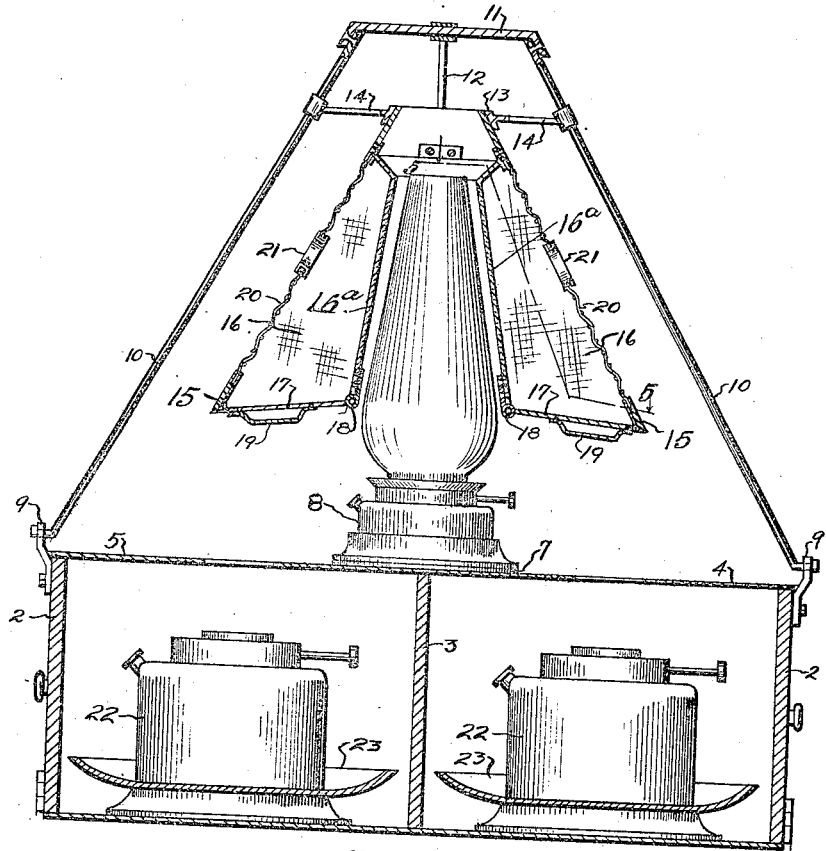
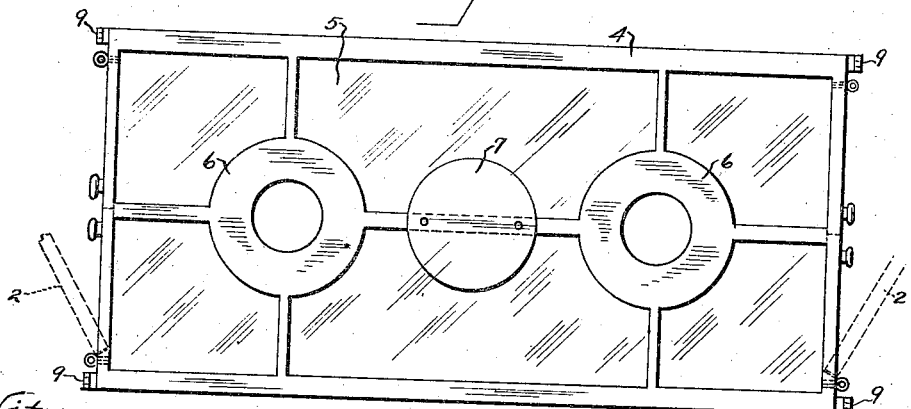
Witnesses
Paul A. Viersen
William R. Piper
Inventor
I. Smedberg
By H. J. Sanders Atty.

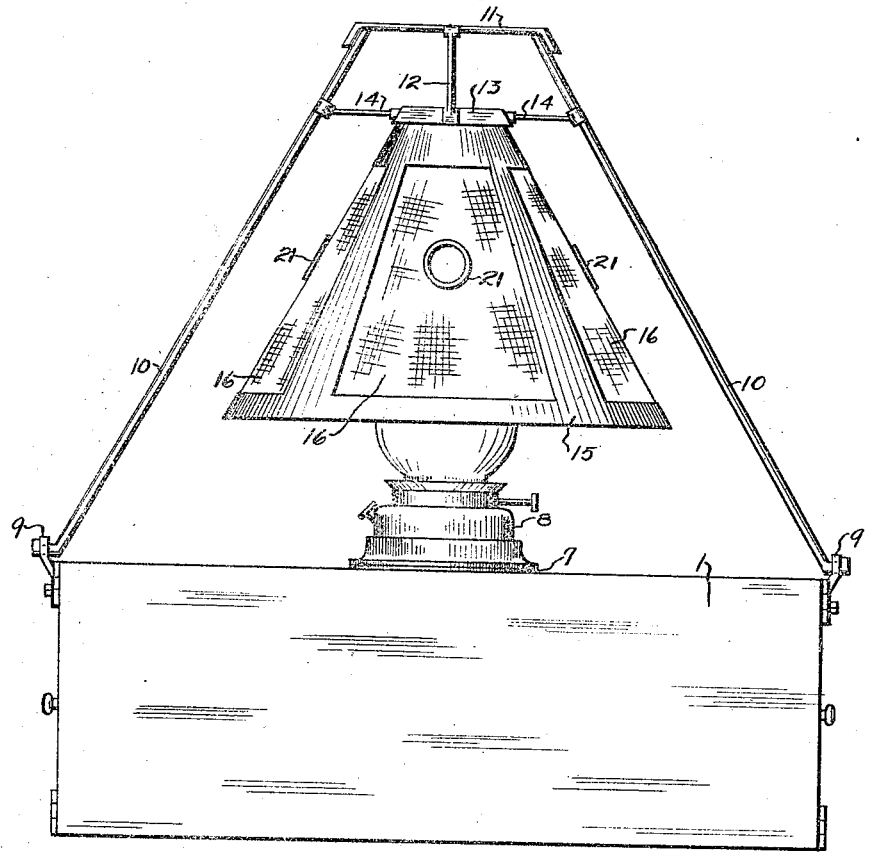
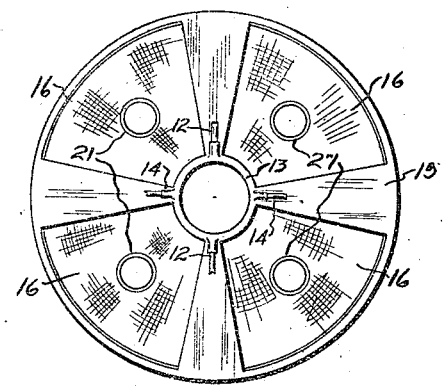
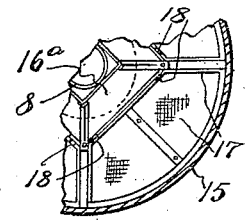

UNITED STATES PATENT OFFICE.

IDA SMEDBERG, OF CHISAGO CITY, MINNESOTA.

INSECT-TRAP.

1,368,767.  Specification of Letters Patent.  Patented Feb. 15, 1921.

Application filed April 12, 1919. Serial No. 289,679.

*To all whom it may concern:*

Be it known that I, IDA SMEDBERG, a citizen of the United States, residing at Chisago City, in the county of Chisago and State of Minnesota, have invented certain new and useful Improvements in Insect-Traps, of which the following is a specification.

This invention relates to improvements in insect traps and its object is to provide a device of this type that is simple in construction and efficient in operation. The trap is adapted particularly to attract and destroy small winged insects such as flies, moths, mosquitos and the like.

With the foregoing and other objects in view the invention consists in the combination and arrangement of parts to be hereinafter fully described, pointed out in the appended claims and illustrated in the accompanying drawings which form a part of this specification and in which—

Figure 1 is a view of my insect trap in side elevation.

Fig. 2 is a vertical section through the trap.

Fig. 3 is a plan view of the casing, two of the doors being shown open in dotted position.

Fig. 4 is a plan view of one lamp employed.

Fig. 5 is a fragmentary sectional view taken on line 5—5 of Fig. 2.

Like reference characters denote corresponding parts throughout the several views.

I provide an oblong casing 1 having doors 2 hinged in its ends and a transverse partition 3, the top of the casing being formed of a partition 4 provided with panes of isinglass 5, perforated ventilating rings 6 and the lamp base 7 adapted to receive the lamp 8. Projecting upwardly from the corners of the casing 1 are the brackets 9 to which the obliquely disposed bars 10 are secured, said bars at their upper ends being connected by the cap 11 from which a pair of oppositely disposed arms 12 depend that carry a collar 13 provided with the arms 14 for engagement with brace rods that connect the rods 10 in pairs. Secured to the collar 13 and depending therefrom is the cage 15 which cage comprises a plurality of compartments 16 each having a door 17 secured thereto by hinge 18 and provided with a handle 19, the door opening downward or toward the partition 4. The inner wall 16ª of the compartments 16 is formed of glass or any transparent material to admit light from the lamp to the said compartments.

The cage is provided also with wire mesh or screen 20 provided with the perforated rings 21. The insects are attracted by the glare of the lamp 8 and they seek the same through the perforations 21 when they become imprisoned in the compartments 16 of the cage and are suffocated. The light will appear brightest through the perforations 21 and so the insects will be strongly attracted to them. Such insects as alight upon the screen 20, however, and do not get through the perforations 21 will be burned or disabled and caused to drop to the isinglass 5 and there cremated. Inside the casing 1 and upon each side of the partition 3 I provide a kerosene lamp 22 provided with a mirror 23 which throws the light against the panes 5 that attract the insects and in seeking the light they pass through the openings in the rings 6 and into the casing when they are suffocated and destroyed. Such insects as are attracted directly to the flame of the lamp 8 will be burned by the chimney or suffocated in the hot atmosphere and caused to drop upon the isinglass 5 and there destroyed.

What is claimed is:—

1. In an insect trap, a casing provided with doors, a semi-transparent top for said casing provided with openings, illuminating means for said top within said casing, and auxiliary illuminated mechanism arranged above said semi-transparent casing top.

2. In an insect trap, a casing having a semi-transparent top, a lamp arranged upon said top, a compartmental cage supported about said lamp, doors for the compartments of said cage, and perforated rings arranged in said compartments.

3. In an insect trap, a casing, a semi-transparent perforated partition for said casing, illuminating devices arranged below said partition, an illuminating device arranged above said partition, a compartmental cage, and doors for the compartments of said cage.

In testimony that I claim the foregoing as my own I have hereto affixed my signature in the presence of two subscribing witnesses.

IDA SMEDBERG.

Witnesses:
J. E. VANSTROM,
ALBIN JOHNSON.